United States Patent [19]

Ramunas

[11] Patent Number: 5,015,003
[45] Date of Patent: May 14, 1991

[54] TOP JAW ASSEMBLY WITH REPLACEABLE WORK HOLDING PADS

[75] Inventor: Valdas S. Ramunas, Euclid, Ohio

[73] Assignee: Kennametal Inc., Latrobe, Pa.

[21] Appl. No.: 509,434

[22] Filed: Apr. 2, 1990

Related U.S. Application Data

[63] Continuation-in-part of Ser. No. 227,944, Aug. 3, 1988, abandoned.

[51] Int. Cl.$^5$ ............................................. B23B 31/12
[52] U.S. Cl. .................................. 279/123; 269/284; 279/1 SJ
[58] Field of Search ................. 279/1 SJ, 123, 110, 279/121; 269/284, 280, 283

[56] References Cited

U.S. PATENT DOCUMENTS

| | | | |
|---|---|---|---|
| 3,583,717 | 6/1971 | Hall et al. | 279/123 |
| 4,362,306 | 12/1982 | Rohm | 279/123 X |
| 4,667,972 | 5/1987 | Hiestand | 279/123 |
| 4,722,536 | 2/1988 | Lane et al. | 279/123 |
| 4,723,877 | 2/1988 | Erickson | 279/1 B X |
| 4,763,906 | 8/1988 | Barbieux | 279/1 SJ X |
| 4,946,177 | 8/1990 | Barbeiux | 279/1 SJ X |

FOREIGN PATENT DOCUMENTS 3434308 3/1986 Fed. Rep. of Germany ...... 279/123

Primary Examiner—Steven C. Bishop
Attorney, Agent, or Firm—Thomas R. Trempus; James G. Porcelli

[57] ABSTRACT

A top jaw assembly is adapted to be mounted on the master jaw of a chuck and includes a replaceable work holding pad. The top jaw assembly includes a top jaw formed with a first support surface lying in an axial plane and a second support surface bored concentric with the central axis of the chuck. An arcuate shape work holding pad having concentric inner and outer surfaces is provided for gripping the work piece. The outer surface is adapted to seat against the second support surface of the top jaw assembly and the inner surface is adapted to grip the work piece. Clamping means are provided which include a locking element adapted to engage the work holding pad. The locking element urges the work holding pad downwardly against the first support surface of the top jaw to axially locate the pad and rearwardly against the second support surface to maintain the inner surface of the pad concentric with the central axis.

20 Claims, 6 Drawing Sheets

TOP JAW ASSEMBLY WITH REPLACEABLE WORK HOLDING PADS

This is a continuation-in-part of application Ser. No. 227,944 filed on Aug. 3, 1988, now abandoned.

BACKGROUND OF THE INVENTION

The present invention relates to a chuck jaw apparatus and more specifically to a quick change mechanism for a top jaw assembly having replaceable pads.

A conventional chuck jaw includes a master jaw mounted on a chuck body, and a top jaw mounted on top of the master jaw. The top jaw is typically provided with a gripping surface adapted to engage a work piece and hold it during machining operations. Normally the gripping surface of the top jaws are machined after they are mounted on the master jaw to assure concentricity of all the gripping surfaces with respect to the axis of the chuck. Each time the top jaw is replaced, the new jaw must be bored after it is mounted. The lost time incurred during the remounting and reboring of the top jaws during changeovers or setups means that productivity of the machine is reduced.

In order to reduce the downtime during changeovers and setups, it is known to use a replaceable work holding pad which is clamped to the top jaw using a quick change clamping mechanism. During changeovers and setups, only the work holding pads need to be replaced. While these types of chuck jaws reduce downtime, they have several drawbacks.

First, most master jaw mounting surfaces are not in the same axial plane. For this reason, most top jaws are machined prior to mounting so that the user can qualify support surfaces. However, the pad axial location is usually established prior to machining the top jaw. Thus, no matter how accurately the top jaws are manufactured, some axial alignment is lost during assembly of the top jaw onto the master jaw.

Another drawback associated with these types of chuck jaws is that the clamping mechanism used for securing the pad to the top jaw tends to push the pad away from its support surface increasing misalignment. If the pads are not seated properly against their support surfaces, the work piece gripping surfaces will not be concentric with the axis of the chuck.

Still another problem with prior art chuck jaw assemblies is that the clamping mechanisms employed to secure the work holding pads to the top jaw are relatively complicated. This results in increased costs in manufacturing and assembling the chuck jaws.

SUMMARY AND OBJECTS OF THE INVENTION

The present invention is a top jaw assembly comprising a top jaw, a replaceable work holding pad releasably mounted to the top jaw, locating means for locating the pad on the top jaw, and clamping means for securing the work holding pad to the top jaw.

The top jaw is formed with a first support surface lying in an axial plane and a second support surface bored concentric with the axis of the chuck. The top jaw is machined prior to mounting it on the master jaw to obtain a predetermined axial location for the first support surface. After mounting the top jaw, the second support surface is bored concentric with the central axis of the chuck body.

In a preferred embodiment, the top jaw comprises a support block and a clamping block. The first support surface is formed in the support block, while the second support surface is formed in the clamping block.

The work holding pad is a generally arcuate shaped member having concentric inner and outer faces. The inner face is adapted to engage a work piece and may be formed with grooves or serrations to facilitate gripping of the workpiece. The outer surface has the same curvature as the second support surface of the top jaw and is adapted to seat against such surface. Locating means are integrally formed with the work holding pad for radially locating the pad on the top jaw.

Clamping means are provided for securing the work holding pad to the top jaw. The clamping means includes a locking element adapted to engage the work holding pad, and an actuator movable between a release position and a locking position. In the locking position, the actuator urges the locking element into engagement with the work holding pad. The clamping force generated by the locking element urges the work holding pad downwardly against the first support surface of the top jaw and pulls it rearwardly against the second support surface.

With the present invention, it is not necessary to replace the entire top jaw during changeovers. Instead, only the work holding pads need to be changed. Thus, time which might otherwise be lost reboring and machining a replacement jaw is saved.

A further benefit of the present invention is that the clamping mechanism positively forces the pad against the qualified surfaces of the top jaw. Thus, accurate axial alignment and concentricity of the gripping surfaces is assured.

It is therefore the primary object of the present invention to provide a top jaw assembly having replaceable work holding pads which can be changed quickly without disassembling the top jaw from the master jaw.

Another object of the present invention is to provide a top jaw assembly that enables the work holding pads to be replaced and remounted on the top jaw with such accuracy that the pads do not need to be bored to locate the workpiece gripping surface concentrically with respect to the chuck axis.

Still another object of the present invention is to provide a top jaw assembly in which the work holding pads can be easily and quickly replaced with minimum of time and effort.

Still another object of the present invention is to provide a top jaw assembly in which the clamping mechanism for securing the work holding pads to the top jaw are contained in a replaceable clamping unit to enable the clamping mechanism to be easily replaced when it is worn.

Still another object of the present invention is to provide a top jaw assembly which is relatively simple in construction and inexpensive to manufacture.

Other objects and advantages of the present invention will become apparent and obvious from a study of the following description and the accompanying drawings which are merely illustrative of such invention.

DETAILED DESCRIPTION OF THE PRESENT INVENTION

The present invention is a top jaw assembly adapted for use in connection with a standard three-jaw chuck. Typically, the chuck includes a chuck body which rotates about a central axis and has three movable master jaws mounted thereon. The master jaws can be moved radially on the chuck body by means of a scroll located internally in the chuck body, or other means well known to those skilled in the art.

Figure 1:
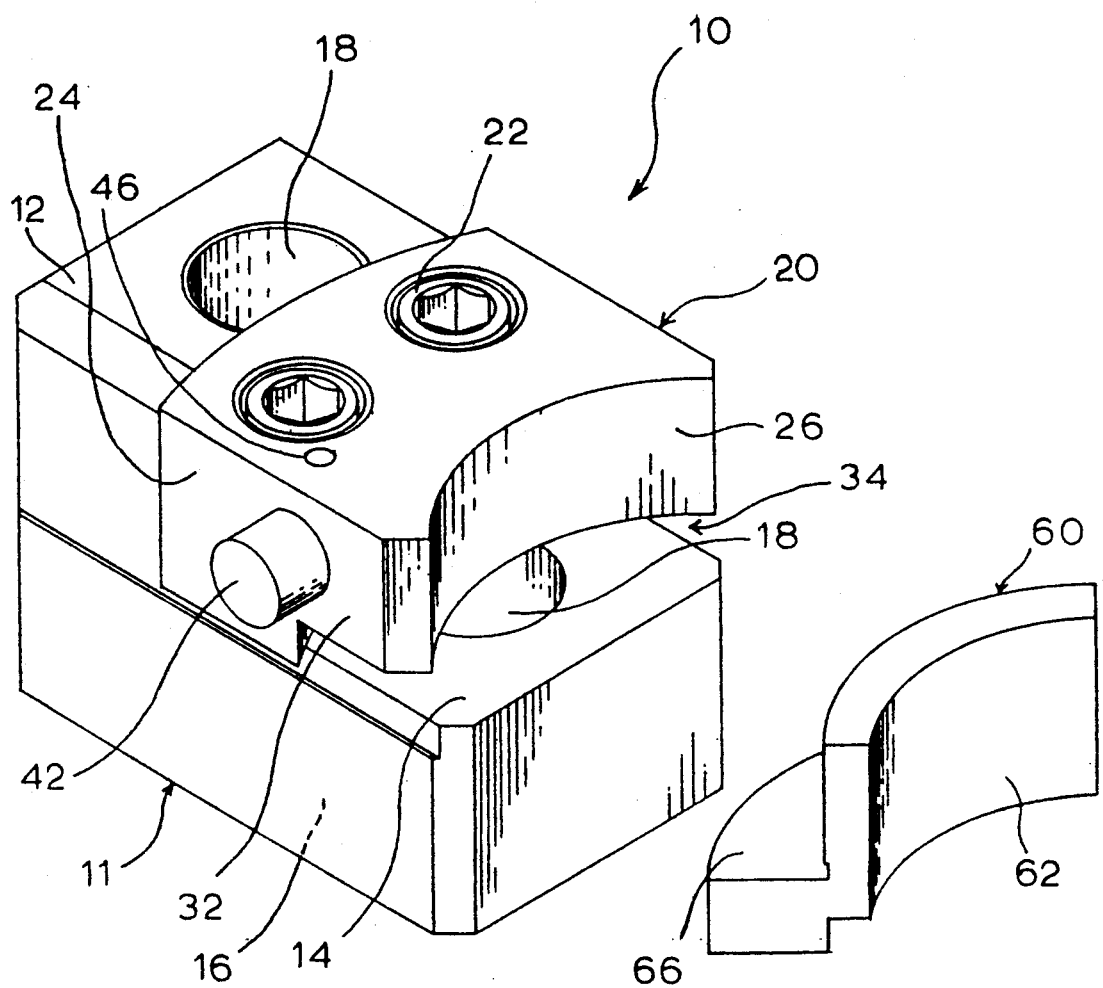
FIG. 1 is a perspective view of the top jaw assembly of the present invention.

The present invention relates specifically to a top jaw assembly adapted to be mounted on the master jaws of a three-jaw chuck. An overall view of a representative embodiment of the top jaw assembly, indicated by the numeral 10, is shown in FIG. 1. Generally speaking, the top jaw assembly 10 includes a top jaw indicated generally at 11 and a work holding pad indicated generally at 60. The top jaw 11 includes a support block 12 and a removable clamping unit 20.

The support block 12 is generally L-shaped when viewed in elevation. Two bolt holes 18 pass through the support block 12 so that it can be bolted to the master jaw by conventional bolts (not shown). The support block 12 includes an upward-facing support surface 14 which lies in an axial plane, that is, a plane perpendicular to the central axis of the chuck body. Prior to mounting the support block 12 to the master jaw, the mounting surface 16 or bottom which seats against the top of the master jaw may be machined so as to establish a predetermined axial location for the support surface 14. It is important for the support surfaces 14 for each of the support blocks 12 to lie in the same axial plane to prevent the workpiece from being misaligned.

The clamping unit 20 mounts to the support block 12 and is secured by bolts 22 which screw into corresponding holes (not shown) formed in the support surface 14. The clamping unit 20 comprises a clamping block 24 having an overhanging portion 32 which defines a slot 34. An inward facing support surface 26, which is bored concentric with the central axis of the chuck body, is formed in the overhanging portion 32. Support surface 26 functions as a seat for the work holding pad 60.

Figure 2:
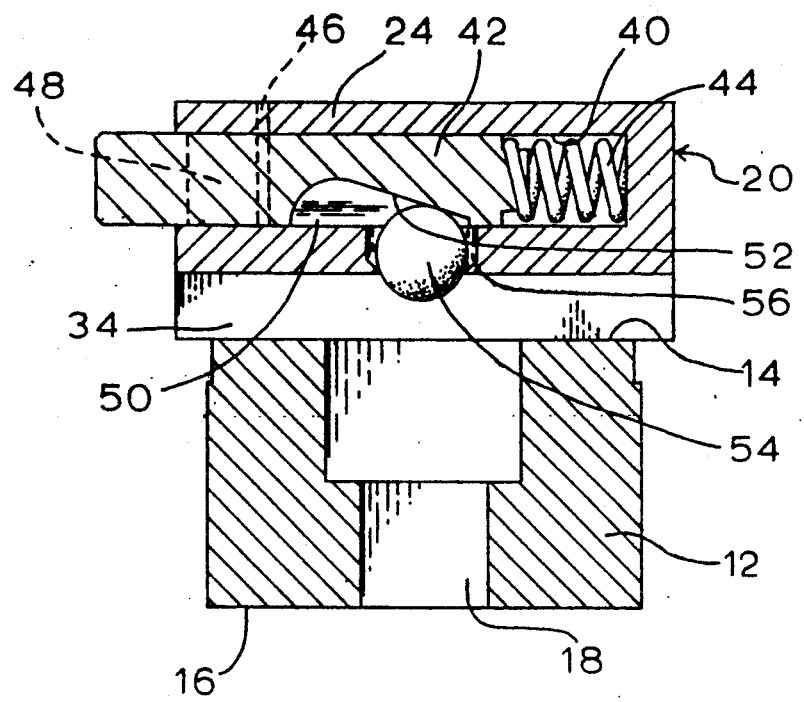
FIG. 2 is a cross-section of the top jaw assembly with the work holding pad removed to illustrate the clamping mechanism.
Figure 3:
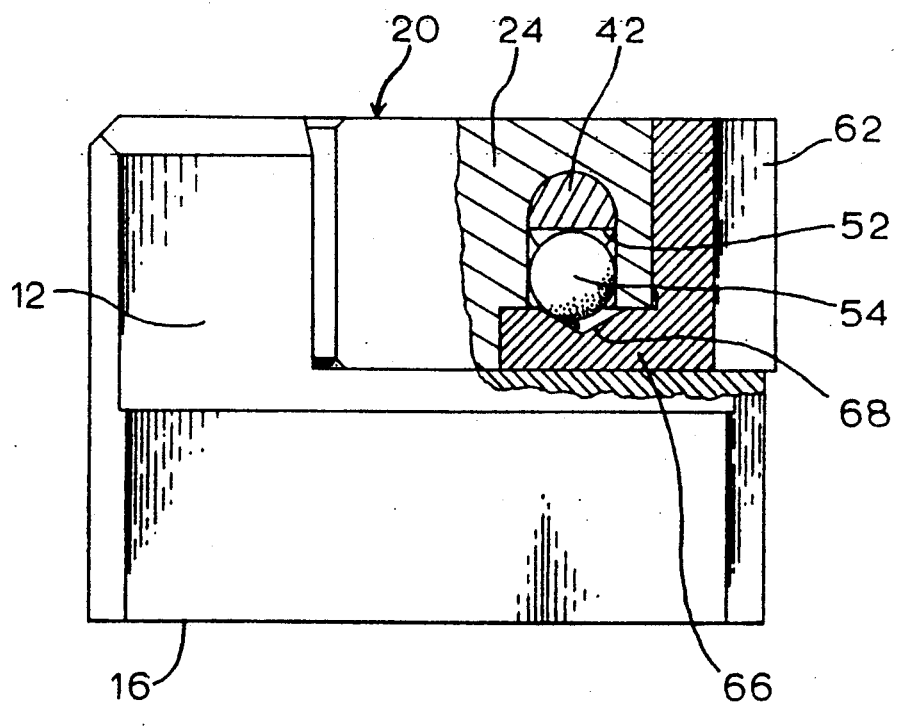
FIG. 3 is a side elevation view of the top jaw assembly with a portion shown in section to illustrate the clamping mechanism.

The clamping block 24 contains a clamping mechanism for clamping the work holding pad 60. As shown in FIGS. 2 and 3, the clamping mechanism generates a clamping force having a downward component which pushes work holding pads 60 against the support surface 14 of the support block 12 and a rearward component which pulls the pad 60 rearwardly to seat the pad 60 firmly against the inward facing support surface 26.

A transverse bore 40 is formed in the clamping block 24 and extends from one side of the block 24 towards the opposite side. An actuator 42 is mounted in the transverse bore 40 for reciprocal movement. The actuator 42 is biased by a spring 44 inserted into the closed end of the transverse bore 40. The actuator 42 is retained in the transverse bore 40 by a retaining pin 46. The retaining pin 46 passes through a notch 48 formed in the backside of the actuator 42 and the ends thereof are embedded in the block 24. The pin 46 engages the sides of the notch 48 to limit the movement of the actuator 42 and to retain it in the transverse bore 40.

The underside of the actuator 42 is formed with a ball clearance area 50. A wedge surface 52 inclines outwardly with respect to the axis of the actuator 42 from the ball clearance area 50. A locking ball 54 is loosely retained within an opening 56 which extends downwardly from the transverse opening 40 through the overhanging portion 34 of the clamping block 24. The lowermost end of ball opening 56 is so sized to allow the ball 54 to partially project from the opening 56 while still retaining the ball 54.

The actuator 42 is biased by spring 44 towards a locking position. In the locking position, the ball 54 is pushed downward by the wedging surface 52 into engagement with the pad 60 as best seen in FIG. 3. The actuator 42 is movable to a release position by applying a releasing force to the exposed end of the actuator 42. In the release position, the wedging surface 52 no longer engages the locking ball 54. Thus, the downward force on the locking ball 54 is removed. Instead, the ball 54 can be pushed upwardly into the ball clearance area 50 thereby disengaging from the pad 60. When the release force is removed from the actuator 42, the spring 44 pushes the actuator 42 back to a locking position.

Figure 4:
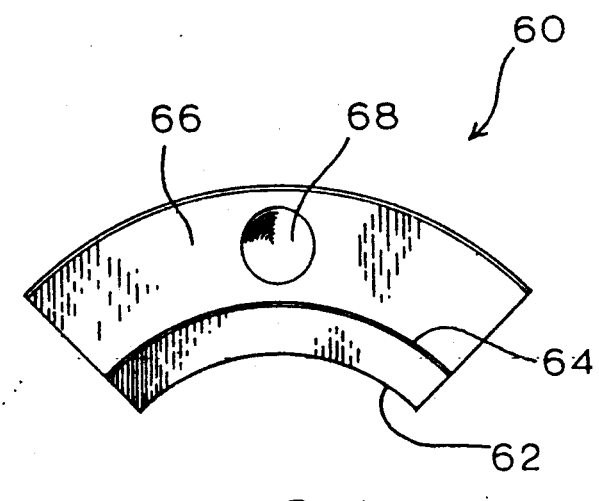
FIG. 4 is a top plan view of the work holding pad.
Figure 5:
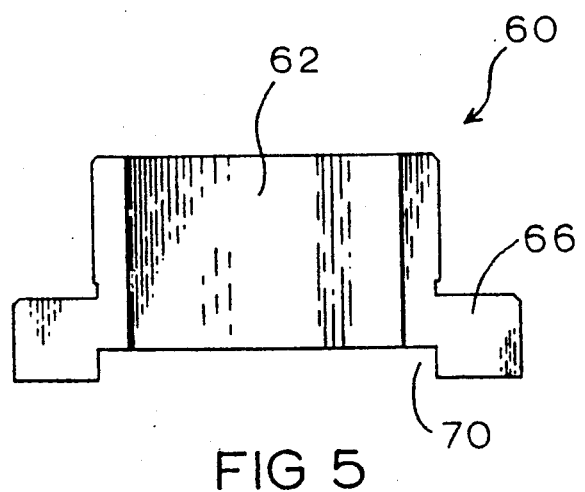
FIG. 5 is a front elevation view thereof.
Figure 6:
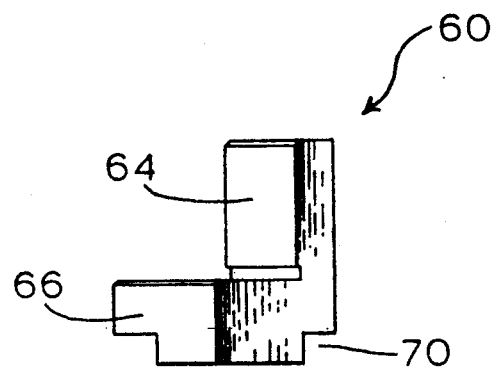
FIG. 6 is a side elevation view thereof.

Referring now to FIGS. 4-6, a work holding pad is shown and indicated generally at 60. The work holding pad 60 is a generally arcuate shaped member having concentric inner and outer faces indicated at 62 and 64 respectively. A clamping flange 66 projects radially from the outer face 64 and is adapted to be inserted into the slot 34 formed beneath the overhanging portion 32 of the clamping block 24. A conical recess 68 is formed on the top side of the clamping flange 66 which is engaged by the locking ball 54 to secure the work holding pad 60 to the support block 12. Also, a keyway 70 is formed in the underside of the clamping flange 66 which is adapted to engage with the sides of the support block 12 to radially locate the pad 60 on the support block 12.

To mount the work holding pad 60, the actuator 42 is depressed to move it to a release position. The clamping flange 66 of the work holding pad 60 is inserted into the slot 34 and the pad 60 is pushed back against the inwardly facing support surface 26 of the clamping block 24. When the actuator 42 is released, the locking ball 54 is urged downwardly as previously described into engagement with the conical recess 68 in the clamping flange 66. It is important that the conical recess 68 be so sized and located that the locking ball 54 engages only the backside of the recess as shown in FIG. 3. This assures that the clamping force generated has a rearward force component and a downward force component. The rearward force component assures that pad 60 seats firmly against support surface 26 thereby maintaining concentricity of the inner surface 62 with the chuck axis. The downward component of the clamping force pushes the pad 60 against support surface 14 assuring accurate axial location of the pad 60.

Figure 7:
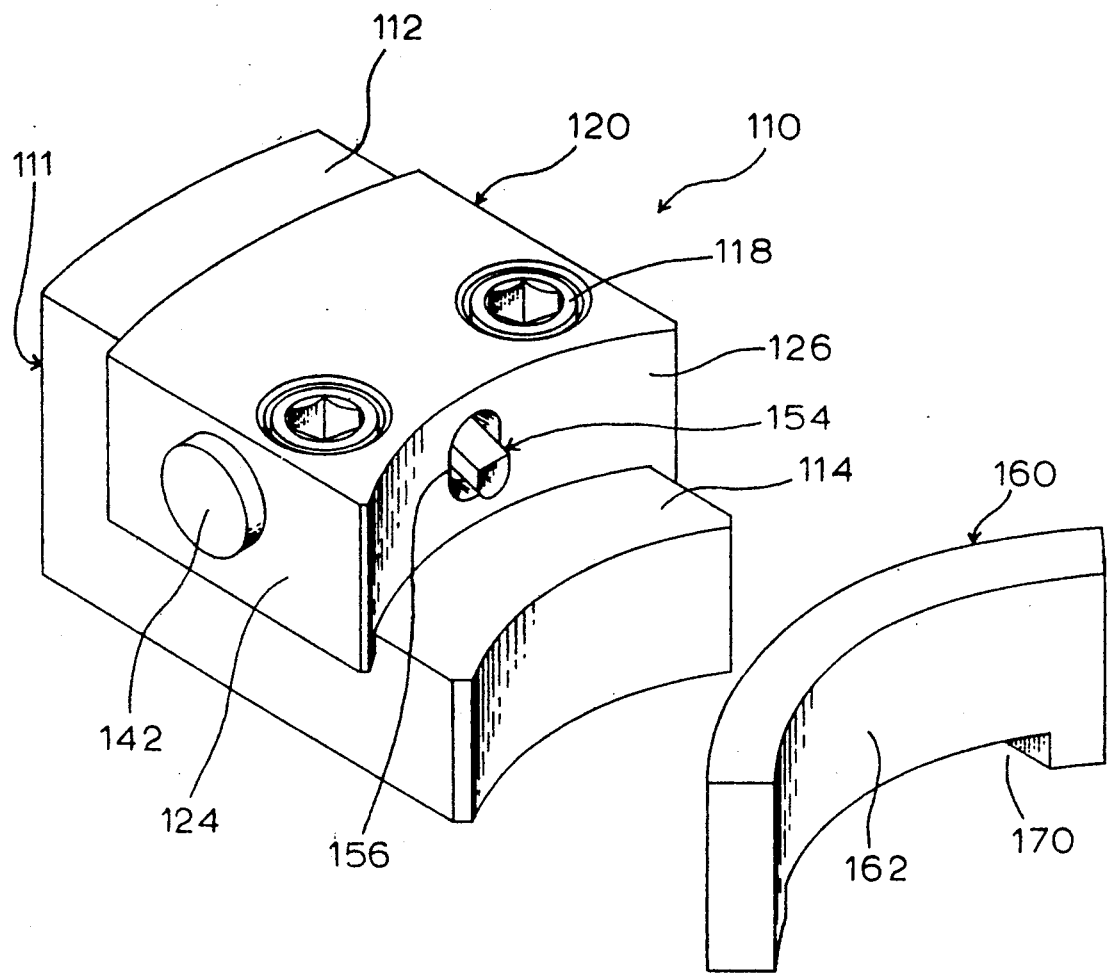
FIG. 7 is a perspective view of a second embodiment of the top jaw assembly.

Referring now to FIG. 7, a second embodiment of the top jaw assembly is shown and indicated generally at 110. As in the previous embodiment, the second embodiment includes a top jaw indicated generally at 111. The top jaw 111 includes a support block 112 and a replaceable clamping unit 120. A replaceable work holding pad is also shown in FIG. 7 and is indicated generally at 160.

The support block 112 of the second embodiment is the same as in the first embodiment. The support block 112 includes a support surface 114 which lies in an axial plane. A replaceable clamping unit 120 mounts to the support surface 114 and is secured by bolts 118 which screw into corresponding holes (not shown) in support surface 114. The clamping unit 120 includes a generally rectangular clamping block 124 having an inwardly facing support surface 126 which is bored concentric with the central axis of the chuck body. As in the previous embodiment, the inwardly facing support surface 126 functions as a rear support surface or seat for the work holding pad 160.

Figure 8:
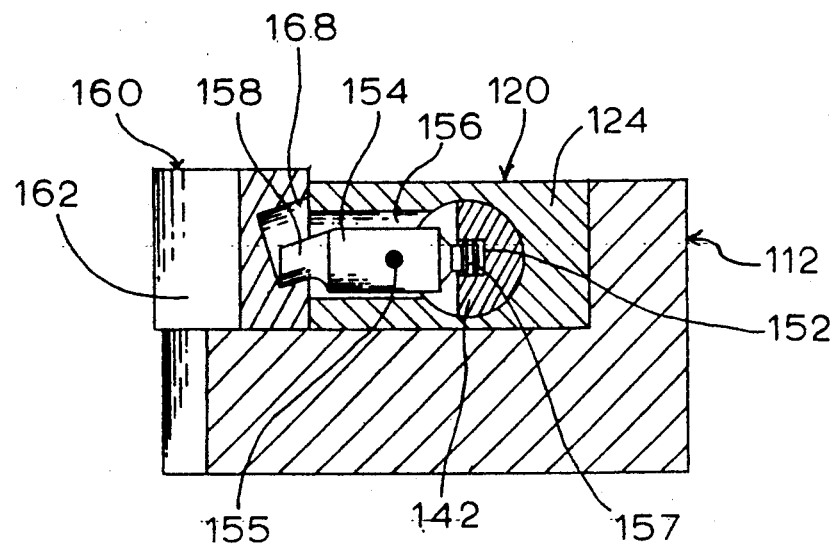
FIG. 8 is a longitudinal section view thereof illustrating the clamping mechanism.
Figure 9:
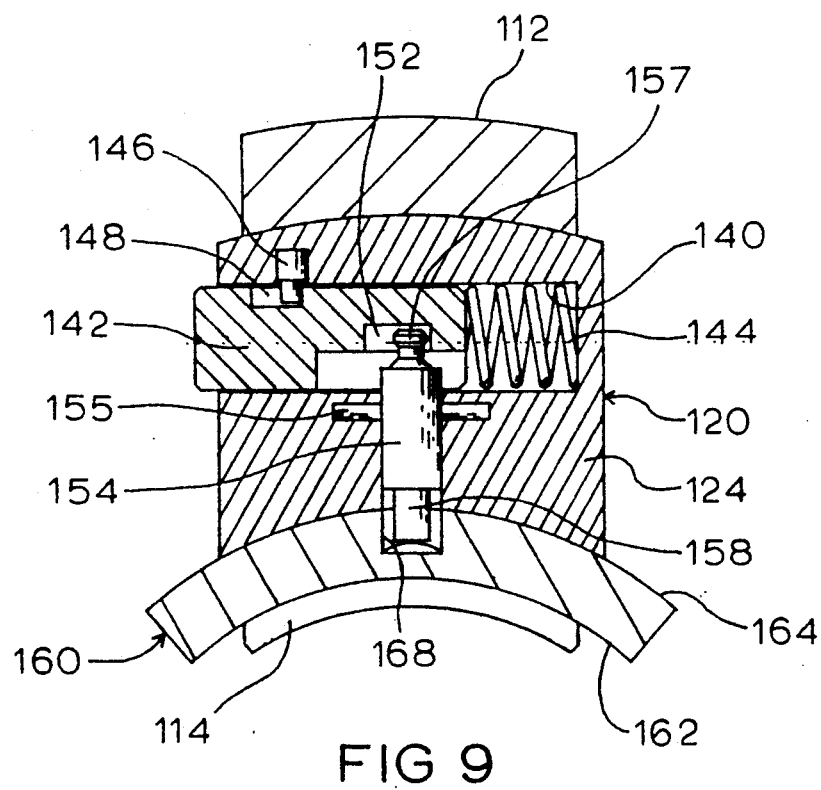
FIG. 9 is a plan section view thereof illustrating the clamping mechanism.

Referring to FIGS. 8 and 9, the clamping mechanism of the second embodiment is shown. As in the first embodiment, the clamping block 124 includes a transverse bore 140 in which an actuator 142 is mounted for reciprocal movement. The actuator 142 is biased by a spring 144 inserted into the closed end of the bore 140 and is retained by a retaining pin 146. The retaining pin 146 extends into a slot 148 in the actuator 142 as best shown in FIG. 9 to limit the movement of the actuator 142.

Figure 10:
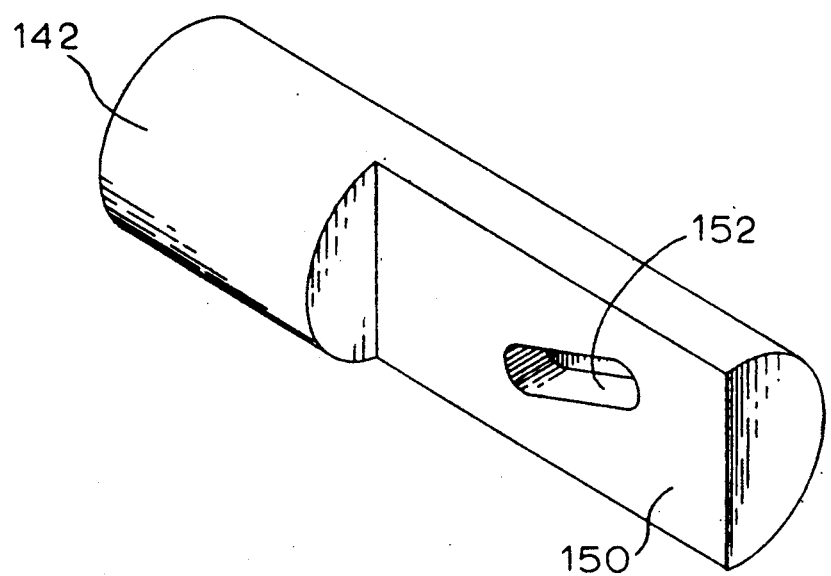
FIG. 10 is a perspective view of the actuator used in the second embodiment.

The actuator 142, which is shown in more detail in FIG. 10, includes a generally flat, forward facing surface 150. An angular slot 152 is formed in the flat surface 150. Slot 152 angles upwardly towards the proximal end of the actuator 142.

Referring back to FIGS. 8 and 9, a latch 154 is pivotally mounted within an opening 156 which extends forwardly from the transverse bore 140 to the inwardly facing support surface 126. The latch 154 functions as the locking element in this embodiment. The latch 154 pivots about a pin 155 which has its ends embedded in the clamping block 124. The butt end 157 of the latch 154 is inserted into the angular slot 152 in the actuator 142. The forward end 158 of the latch 154 extends downwardly at an angle as best shown in FIGS. 7 and 8. The forward end 158 of the latch 154 projects outwardly from the clamping block 124 and is adapted to engage the work holding pad 160.

The actuator 142 is biased towards a locking position as shown in FIG. 8 and 9. In the locking position, the forward end 158 of latch 154 is pushed downward. When the actuator 142 is depressed, the butt end 157 of the latch 154 slides within slot 152 thereby causing the latch 154 to pivot about the pivot pin 155. In other words, by depressing the actuator 142 the forward end 158 of the latch 152 is raised upwardly to release the work holding pad 160.

The work holding pad 160 of the second embodiment is also a generally arcuate shaped pad having concentric inner and outer faces 162 and 164. A latch opening 168 is drilled angularly into the outer face 164 of the pad 160 as best seen in FIG. 8. Also, a keyway 170 is formed along the bottom edge of the pad 160 which is adapted to engage the side walls of the support block 112 to radially locate or index the pad 160 on the support block 112. Unlike the first embodiment, the pad 160 of the second embodiment does not include a rearwardly projecting flange. The absence of the clamping flange simplifies the manufacture of the pad 160 and is more cost efficient.

To mount the work holding pad 160 the actuator 142 is depressed to move it to a release position. With the forward end 158 of the latch 154 raised, the pad 160 is mounted to the support block 112 and pushed back against the inwardly facing support surface 126 of the clamping block 124. When the actuator 142 is released, the forward end 158 of the latch 154 engages the wall of the latch opening 168 in pad 160. The clamping force exerted by the latch 154 urges the pad 160 downwardly against the qualified support surface 114 of the support block 112, and at the same time pulls the pad 160 rearwardly against the inwardly facing support surface 126 of the clamping block 124.

From the foregoing, it is apparent that the present invention provides an improved top jaw assembly having a replaceable work holding pad. The improved top jaw assembly assures both accurate axial location of the work holding pad and concentricity of the pad's gripping surface with the central axis of the chuck. Further, the clamping mechanism can be easily replaced when the parts break or become worn since it is contained entirely within a removable clamping unit.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A top jaw assembly having replaceable work holding pads comprising:
   (a) a top jaw adapted to be mounted on a master jaw of a chuck rotatable about a central axis, the top jaw including a first support surface lying in an axial plane and a second support surface concentric with the central axis of the chuck;
   (b) an arcuate shaped work holding pad releasably secured to the top jaw and having concentric inner and outer surfaces, the outer surface being adapted to seat against the second support surface of the top jaw assembly and the inner surface being adapted to grip a workpiece;
   (c) clamping means for releasably securing the work holding pad to the top jaw, the clamping means including a locking element for engaging the work holding pad so as to urge the work holding pad downwardly against the first support surface to axially locate the pad and rearwardly against the second support surface to maintain the inner surface of the pad concentric with the central axis; and
   (d) locating means for indexing the work holding pad on the top jaw assembly.

2. The top jaw assembly according to claim 1 wherein the locating means comprises a keyway formed in the work holding pad which is adapted to snugly receive the top jaw.

3. The top jaw assembly according to claim 1 wherein the work holding pad includes a radially extending flange and wherein the top jaw is formed with a slot adapted to receive the radially extending flange of the work holding pad.

4. The top jaw assembly according to claim 3 wherein the radially extending flange is formed with an inclined surface which is engaged by the locking element to secure the pad to the top jaw.

5. The top jaw assembly according to claim 1 further including means for biasing the locking element into engagement with the work holding pad.

6. The top jaw assembly according to claim 5 wherein the biasing means includes an actuator engaged with the locking element for urging the locking element into contact with the work holding pad when the actuator is in a locking position, the actuator being movable to a release position in which the work holding pad can be disengaged from the locking element.

7. The top jaw assembly according to claim 6 wherein the locking element is a ball and wherein the actuator includes a wedge surface which contacts the ball to urge it into engagement with the work holding pad when the actuator is in a locking position.

8. The top jaw assembly according to claim 7 wherein the actuator includes a ball clearance area into which the locking element may recede when the actuator is in a release position.

9. The top jaw assembly according to claim 6 wherein the locking element is a pivotally mounted latch including a forward end and a butt end, and wherein the actuator includes an angled slot engaged with the butt end of the latch so that when the actuator is in a locking position the forward end of the latch is urged downwardly into engagement with the work holding pad, and so that when the actuator is in a release position, the forward end of the latch is urged upwardly out of engagement with the work holding pad.

10. The top jaw assembly according to claim 9 wherein the work holding pad is formed with a latch opening extending downwardly at an angle from the outer surface of the pad, and wherein the forward end of the latch extends into the latch opening and engages with the inner surface thereof to secure the work holding pad to the top jaw.

11. A top jaw assembly comprising:
 (a) a top jaw adapted to be mounted on a master jaw of a chuck rotatable about a central axis, including:
  (1) a support block having a first support surface lying in an axial plane with respect to the central axis; and
  (2) a clamping block having a second support surface concentric with the central axis removably mounted to the support block;
 (b) an arcuate shaped work holding pad releasably secured to the top jaw and having concentric inner and outer surfaces, the outer surface of the pad being adapted to seat against the second support surface of the top jaw assembly and the inner surface being adapted to grip a work piece;
 (c) clamping means contained within the clamping block for releasably securing the work holding pad to the top jaw, the clamping means including a locking element for engaging the work holding pad so as to urge the work holding pad downwardly against the first support surface to axially locate the pad and rearwardly against the second support surface to maintain the inner surface of the pad concentric with the central axis; and
 (d) locating means for indexing the work holding pad on the top jaw assembly.

12. The top jaw assembly according to claim 11 wherein the locating means comprises a keyway formed in the work holding pad which is adapted to snugly receive the top jaw.

13. The top jaw assembly according to claim 12 wherein the work holding pad includes a radially extending flange and wherein the top jaw is formed with a slot adapted to receive the radially extending flange of the work holding pad.

14. The top jaw assembly according to claim 13 wherein the radially extending flange is formed with an inclined surface which is engaged by the locking element to secure the pad to the top jaw.

15. The top jaw assembly according to claim 11 further including means for biasing the locking element into engagement with the work holding pad.

16. The top jaw assembly according to claim 15 wherein the biasing means includes an actuator engaged with the locking element for urging the locking element into contact with the work holding pad when the actuator is in a locking position, the actuator being movable to a release position in which the work holding pad can be disengaged from the locking element.

17. The top jaw assembly according to claim 16 wherein the locking element is a ball and wherein the actuator includes a wedge surface which contacts the ball to urge it into engagement with the work holding pad when the actuator is in a locking position.

18. The top jaw assembly according to claim 17 wherein the actuator includes a ball clearance area into which the locking element may recede when the actuator is in a release position.

19. The top jaw assembly according to claim 16 wherein the locking element is a pivotally mounted latch including a forward end and a butt end, and wherein the actuator includes an angled slot engaged with the butt end of the latch so that when the actuator is in a locking position the forward end of the latch is urged downwardly into engagement with the work holding pad, and so that when the actuator is in a release position, the forward end of the latch is urged upwardly out of engagement with the work holding pad.

20. The top jaw assembly according to claim 19 wherein the work holding pad is formed with a latch opening extending downwardly at an angle from the outer surface of the pad, and wherein the forward end of the latch extends into the latch opening and engages with the inner surface thereof to secure the work holding pad to the top jaw.

* * * * *